INVENTOR.
LORNE W. NELSON
BY
ATTORNEY

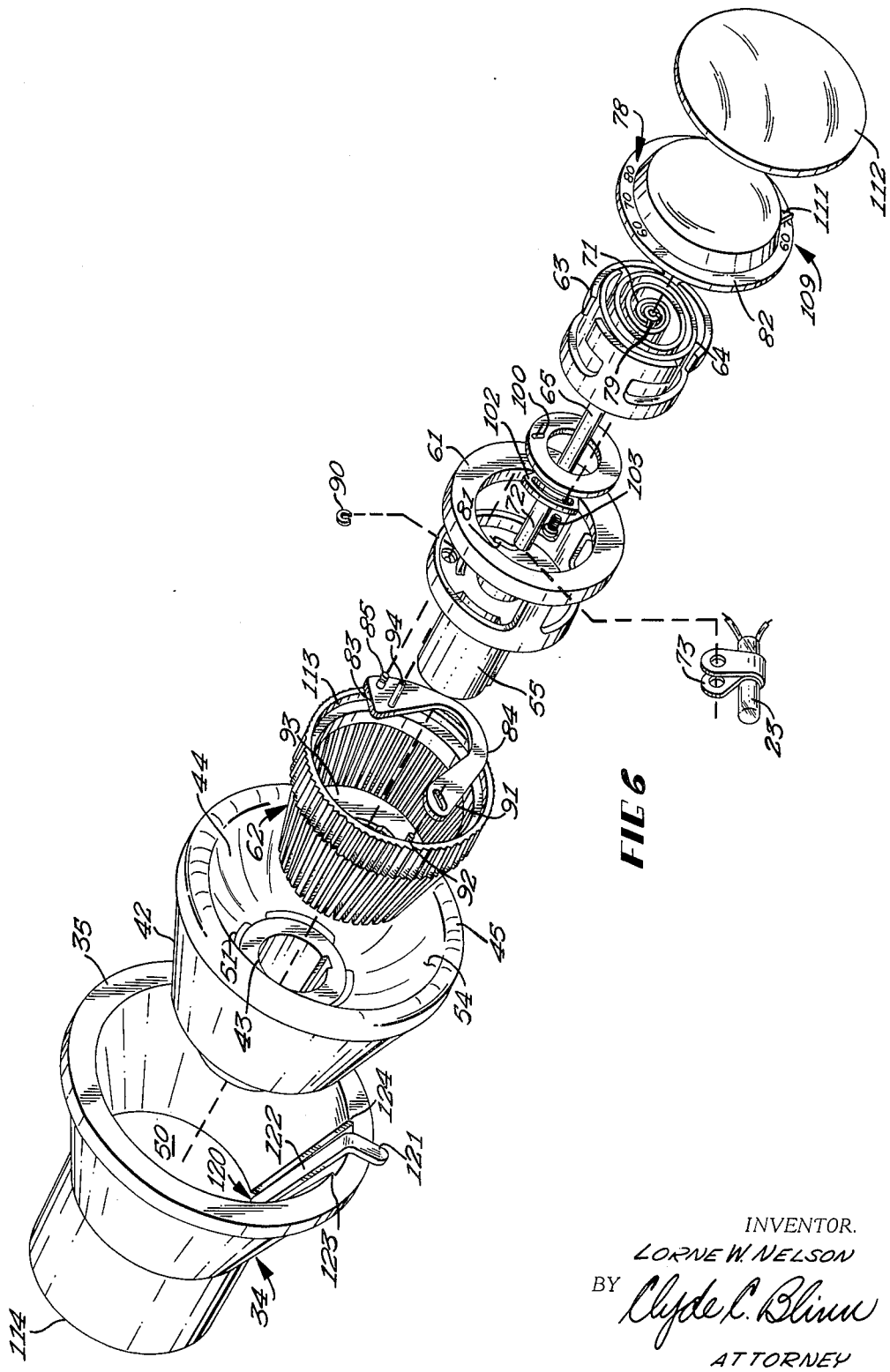

United States Patent Office 3,238,338
Patented Mar. 1, 1966

3,238,338
THERMOSTAT APPARATUS WITH MEANS TO PREVENT THE ADVERSE EFFECT OF A COLD WALL
Lorne W. Nelson, Bloomington, Minn., assignor to Honeywell Inc., a corporation of Delaware
Filed Apr. 17, 1964, Ser. No. 360,706
9 Claims. (Cl. 200—138)

The present invention is concerned with an improved temperature responsive device or thermostat for responding to the temperature in a space; in particular, the invention is concerned with a temperature responsive device which can be recessed along the surface of a wall and respond to the temperature of air which is indicative of the space temperature and yet be relatively unaffected by the temperature of a layer of air which moves along the surface of the wall and which may be either warmer or colder than the space temperature.

Present day space thermostats may be designed with a compromise between two opposing market accepting conditions. A thermostat should respond to the temperature of the air in the space and when connected to certain temperature conditioning apparatus should control the temperature in the space as accurately as possible. When a thermostat is mounted on a wall of a space where the wall is affected by outdoor conditions such as temperature and solar radiation or by internal disturbances such as lights, appliances, etc., the movement of a layer of air passing along the wall can abnormally affect the temperature of the thermostat and the control of the temperature in the space. The prior art thermostats have been designed to project outward from the wall so the temperature sensing element of the thermostat is far enough out from the wall to be relatively unaffected by the wall temperature and the flow of air or boundary air along the wall surface and affected only by the temperature of the air beyond the boundary layer whether the air is static or flowing in a downward or upward direction over the sensing element. Such a projecting thermostat has provided satisfactory control of the space temperature; however, the ornamental aspects of the thermostat often present quite a problem. Where a thermostat is not especially attractive as far as the overall decoration of the space is concerned, a compromise has often been necessary which results in the reduction in the size of the thermostat so the thermostat does not project as far from the wall to overcome the adverse appearance and yet at the same time, the effect of the wall temperature on the sensor or wall coupling results in poor control of the space temperature.

In addition, the effect of the wall coupling on a thermostat presents numerous problems as far as the correct installation of a thermostat is concerned. If a thermostat is affected by the wall temperature, specific instructions must be given with the thermostat so the ultimate customer or installer of the thermostat will make certain that the thermostat is not mounted on a wall where the conditions would adversely affect the quality of the control obtained by the thermostat. Many thermostat manufacturers provide very specific instructions for the installation of the thermostat on a wall which presents the least deviation of wall temperature from space temperature. When such instructions must be followed to obtain good results from a thermostat, the manufacturer is relying upon the ultimate installer to correctly install the thermostat. In addition, when certain instructions must be followed to install the thermostat in selected locations, the thermostat cannot always be located in an inconspicuous place or in a place which would tie in with the room decoration.

The present invention provides a thermostat which can be recessed in the wall so the sensing element is in close proximity to the wall surface and does not project far into the space. The sensing element of the thermostat is mounted in such a manner that a certain portion of the air flowing along the surface of the wall can flow behind the sensing element so as to not affect the temperature of the sensing element and to make the thermostat relatively insensitive to the temperature of a cold or hot wall. In this manner, the present invention provides a thermostat which is highly ornamental and does not project a great distance away from the wall surface and yet the thermostat is less susceptible to wall surface temperatures to greatly reduce the installation difficulties heretofore experienced.

Specifically, a recessed opening behind the sensing element allows some of the cold air which normally flows downward along the surface of the wall during winter conditions to pass behind the sensing element. The cold layer of air floating downward along the wall surface follows the contour of the recessed thermostat due to the Coanda Effect; even though the contour of the recessed thermostat may deviate from the normal axis of the layer of air flowing downward along the wall which is directly toward the sensing element.

An object of the present invention is to provide an improved thermostat having a sensing element mounted close to the wall surface and relatively unaffected by the temperature of air flowing over the wall surface;

Another object of the present invention is to provide an improved thermostat having a recessed body with a cup shaped opening containing a sensing element mounted in the recessed opening so a certain portion of the air flowing along the surface of the wall flows into the recessed opening behind the sensing element to not affect the sensing element;

Another object of the present invention is to provide a thermostat adapted to be mounted in a wall with a recessed opening supporting a sensing element for controlling a switch in response to the temperature of the space and being relatively unaffected by the flow of cold air along the surface of the wall; and Another object of the present invention is to provide a set point adjustment mechanism for a thermostat wherein a rotary set point knob is coupled to an adjustable means for the temperature responsive element to provide a small angular movement of said element over a large movement of said set point adjustment knob.

These and other objects of the present invention will become apparent upon the study of the following specification and drawings of which:

FIGURE 6 is an exploded view of the thermostat shown in FIGURE 1 with the parts of the sensing element as shown in FIGURES 2 and 5.

Figure 1:
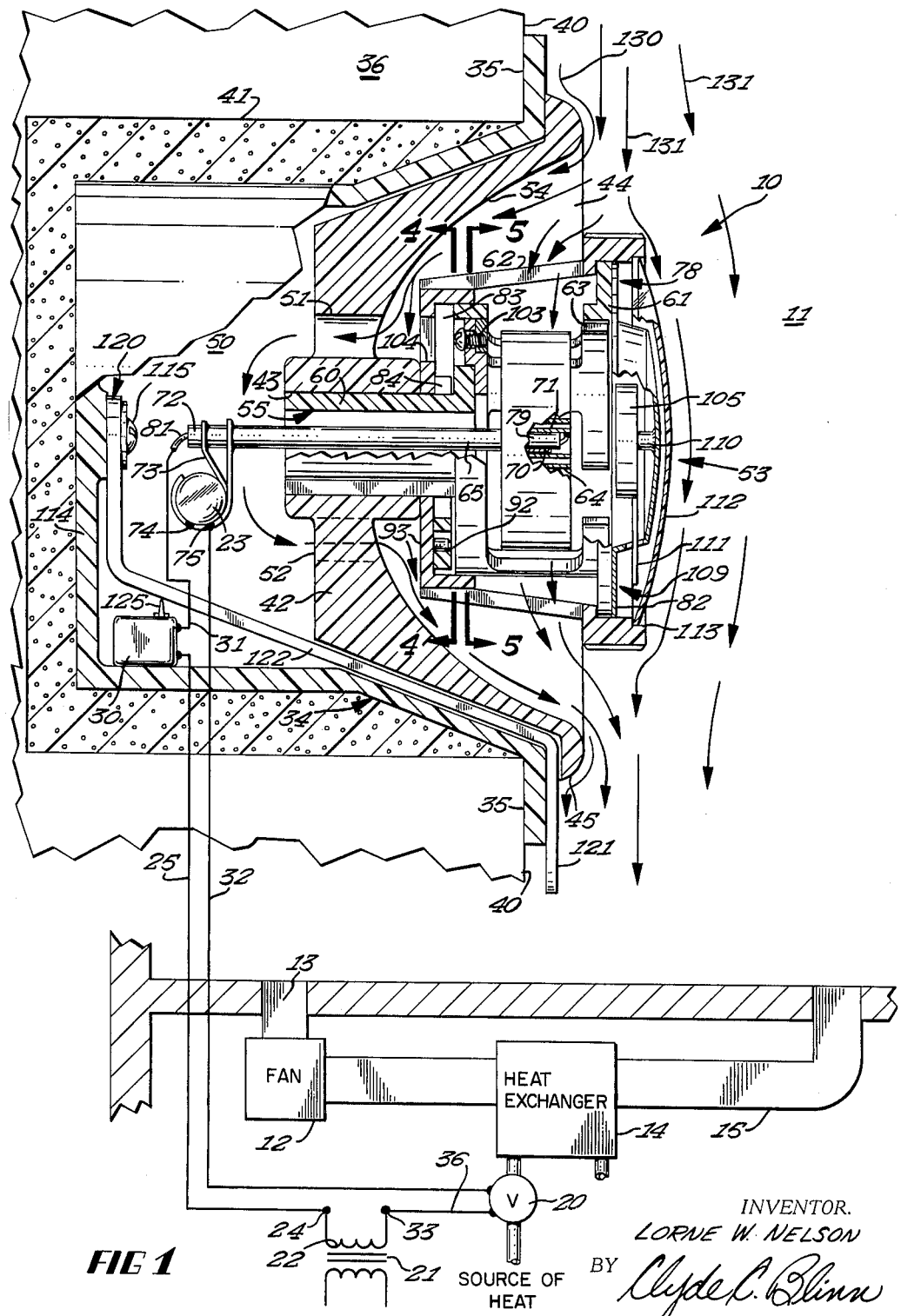
FIGURE 1 is a schematic view of the improved thermostat as shown connected for controlling a typical space temperature conditioning system.
Figure 2:
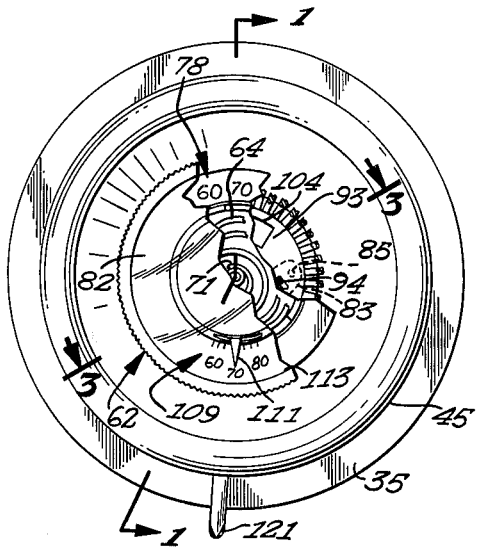
FIGURE 2 is a front sectional view of the sensing element of the thermostat shown in FIGURE 1.

Referring to FIGURE 1, a thermostat 10 is connected to a conventional temperature conditioning system for controlling the temperature in a space 11. Air is circulated by a fan 12 through a duct network by drawing air in a return duct 13 from space 11 and passing the air through a heat exchanger 14 and into a supply duct 15 which is connected to space 11. Heat exchanger or coil 14 receives heated medium from a supply under the control of a conventional valve 20. A source of power 21 having a secondary 22 which is connected to valve 20 by a switch 23 of thermostat 10 by a circuit traced as follows: from one side 24 of the secondary winding 22, a conductor 25, a switch 30, a conductor 31, a conductor 81, a heater 79, a shaft 65, a clip 73, switch 23, conductor 32, valve 20 and back to another side 33 of the secondary winding through conductor 36. When switch 30 is closed, valve 20 is operated each time switch 23 is closed in response to a need for conditioned air to space 11 as determined by thermostat 10.

Thermostat 10 has a base 34 having a cylindrical shape with an open end. The base 34 is adapted to be mounted in a wall with a flange 35, which is the periphery of the open end, adjacent the surface of a wall 40. Base 34 is insulated by an insulation coating 41 to reduce the heat transfer of the thermostat mechanism mounted in the base to the outside wall and stud space 36. A separating member 42 having a hole 43 and a front recessed cup shaped opening 44 is mounted in base 34 so the ridge or edge 45 lays adjacent flange 35 and wall 40 to provide a chamber 50 to the rear of separating member 42. In addition to hole 43, separating member 42 has ventilation holes 51 and 52 which provide for the flow of air through chamber 50 for keeping the temperature of the air in chamber 50 as close to the space temperature as possible to reduce the effect of the wall 40 and stud space 36 temperature on the sensing element 64 of the thermostat.

A sensing element 53 is mounted in the space of opening 44 slightly beyond the surface 54 of opening 44 to provide an air flow passage behind sensing element 53. Specifically the sensing element is made up of a first supporting member 55 which has a tubular projecting portion 60 and a circular enclosure member or cage portion 61. Portion 60 is received by hole 43 to hold cage 61 in the center of opening 44 in front of surface 54. A cup shaped control point setting member or knob 62 is rotatably mounted on portion 60 to enclose cage 61. Contained in cage 61 is a circular member 63. A spiral bimetal element 64 is contained in member 63 and has its outer extremity connected to member 63. A hollow tube shaft 65 which extends through portion 60 is connected at one end 70 to the inner extremity 71 of bimetal 64 whereby upon a change in temperature of bimetal 64 shaft 65 is rotated. Switch 23 is mounted on shaft 65 at the other end 72 by means of a clip 73 so upon a change in temperature of bimetal 64, shaft 65 is rotated. Switch 23 might be of a conventional mercury switch type with mercury to short a pair of electrodes 74 and 75. Electrode 75 is connected to conductor 32 and electrode 74 is common with clip 73 to provide a circuit for a "heat anticipation" heater 79 which is mounted in end 70 of shaft 65. The electrical connection for heater 79 is provided by connecting one side of the heater to shaft 65 at end 70 and the other side of the heater to a wire 81 which passes through the shaft and is connected to conductor 31. The electrical connection places heater 79 in series with switch 23 so the heater is energized each time the thermostat calls for heat for the normal "heat anticipation" type of operation. The bimetal 64 is artificially heated to shut off the heat supply to the space in anticipation of the rise in space temperature.

Figure 3:
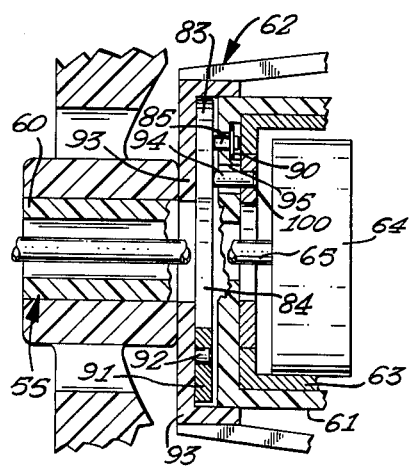
FIGURE 3 is a side sectional view of the sensing element shown in FIGURE 1 and FIGURE 2.
Figure 5:
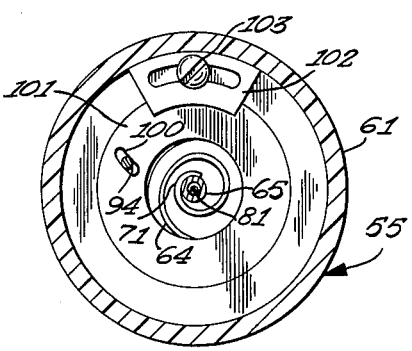
FIGURE 5 is another sectional view of the control point adjustment mechanism of the thermostat shown in FIGURE 1.

In order to provide a control point setting operation for the thermostat, member 62 is connected to the enclosure 63 to provide for rotation of enclosure 63 when the knob 62 is turned. In this manner, the outer extremity of bimetal 64 which is connected to member 63 is readjusted to change the control point of the thermostat. Since member 62 cooperates with an index 78 on scale plate 82 which is fastened to member 61, and it is desired to magnify the motion of member 62 for a given movement of member 63, a motion reduction mechanism is used to connect member 62 to member 63. One end 83 of lever 84 is pivotally connected to member 61 by a pin 85 and lock washer 90 shown in FIGURE 3 and FIGURE 6. The other end 91 of lever 84 is pivotally connected by a pin 92 to an adjacent back 93 of the set point adjustment member 62. Upon the rotation of member 62, the lower end of lever 84 is pivoted with respect to pin 85 as member 61 is stationary. Intermediate the ends of lever 84 is a third pin 94 which projects through an opening 95 in member 61 to be received in a hole 100 of an adjustable washer 101 which is connected to the rear side of member 61 by a flange 102 and screw 103. As lever 84 pivots about member 85, angular movement of member 63 takes place at the lesser degree than the angular movement of set point adjusting member 62. A hole 104 is provided through the rear surface of member 62 so the adjustment of washer 101 with respect to member 63 can take place with the sensing element 53 assembled and after the adjustment is made screw 103 can be tightened to hold the washer 101 fixed with respect to member 63.

Mounted on the underside of scale plate 82 is a spiral bimetal 105 which has one end connected to a shaft 110 which is attached to the center of scale plate 82. Another end of bimetal 105 connected to a pointer 111 which cooperates with an index 109 on a lower side of scale plate for providing a temperature indication. A transparent member 112 which is held in a notch 113 around the front opening of member 62 provides a cover and allows for visual inspection of the ambient temperature as shown by the pointer 111 and for the control point adjustment setting which is established by an appropriate marking on the outer rim of member 62 and cooperates with an index 78 on scale plate 82.

Attached to the rear portion 114 of case 34 by means of a screw 115 is a lever 120 which is pivotally supported and projects to the front of the thermostat having an end 121 which can be manually operated. The center portion 122 of the lever passes between the case 34 and separating member 42 but is limited in angular movement by stops 123 and 124 as shown in FIGURE 6 which are formed by a groove in case 34 which provides the space for the center portion 122 of the lever. Switch 30 which is of a conventional type such as shown in the McGall Patent 1,960,020 has an operating button 125 which projects upward to be engaged by lever 120. In this manner, lever 120 can control the operation of the thermostat so that upon movement of the extreme end 121 of the lever the system can be turned on or off.

*Operation*

Referring to FIGURE 1, thermostat 10 is shown mounted in a recessed manner in a wall which in many cases might be a relatively cold wall when the outdoor temperature of the building is cold. For many years, heating engineers have been aware of the presence of a cold layer of air 130 or boundary layer of air which moves downward along the surface of the wall 40. The thickness of the layer varies with the wall temperature which changes as the outdoor weather conditions change. The colder the wall surface, the greater the temperature differential between the average air temperature and the wall temperature. As the distance from the wall increases, the air temperature becomes closer to the average air temperature; therefore while a thermostat cannot avoid being affected by the boundary layer if the sensing element is not subjected to the air closest to the wall surface, the major effect of the cold wall is eliminated. Heretofore, in order to avoid the adverse effects of the downward movement of the cold layer of air, sensing element 53 of the thermostat was made to project away from the surface of the wall a considerable distance to not be affected by the downward flow of air. The air temperature increases to be more like the average space temperature as the distance from the wall increases. Thus air 131 may have a downward movement due to the influence of the flow of cold air 130; however, at a certain distance away from the wall, the air temperature becomes more representative of the temperature of the air in space 11.

The air stream or flow along a surface has been known for years to tend to follow the curvature of the surface. The phenomena known as the Coanda Effect was discovered many years ago and has been used to describe the air movement in connection with aerodynamics for both aircraft and the flow of air in heating systems such as the flow of air from a wall air output in a heating system. The tendency of a jet of gas to follow the wall contour when the wall surface curves away is defined as the Coanda Effect in Van Nostrand's Scientific Encyclopedia, third edition 1958 on page 363. As the cold layer of air 130 moves downward along wall 40, the air tends to follow the surface 54 of the inner cup shaped opening of separating member 42. The path of the air flow deviates from the normal path of flow in line with the wall surface to follow the surface of the recessed opening. Some of this cold air may pass through holes 51 and 52 through chamber 50 and out along the lower portion of separating member 42 to continue along the surface of wall 40 and some of the air may pass behind the sensing element 53 in the space between the back side 93 of member 62 and the surface 54 of member 42. By the proper design of the recessed opening of member 42, the boundary layer of air 130 which is the coldest portion of downward flowing air can be caused to avoid flowing directly downward on the sensing element 53 which would adversely affect the temperature of bimetal 64. At the same time, the air 131 which has a temperature more representative of the temperature of air in space 11 moves downward across sensing element 53 to affect the temperature of bimetal 64.

Even if such were possible, a thermostat which is completely unaffected by wall temperature is not always satisfactory. In the present thermostat, the coldest boundary layer air will flow behind sensing element 53, but some of the downward moving air 131 will have a temperature affected by the wall temperature. The beneficial effect of wall temperature on a thermostat results in the "offsetting" of the control point to overcome the adverse effect of body heat radiation to a cold wall. In the present thermostat, a portion of the boundary layer air avoids the sensing element.

By making use of the Coanda Effect, the flow of the layer of coldest air 130 can be made to avoid a sensing element 53 which is located substantially in line with the wall surface or even recessed behind the wall surface. In this manner, the thermostat can have a temperature responsive element 64 which will respond to the temperature of the air more indicative of the temperature of the space and yet the sensing element 53 can be recessed in the wall to make the unit more ornamental and less subject to the human element which is the case where a thermostat projects outward from the wall surface.

As the bimetal 64 decreases in temperature due to a drop in temperature in space 11, a rotation of shaft 65 takes place to tip switch 23 until the circuit between conductors 31 and 32 is closed to bring about the energization of valve 20. At the same time that valve 20 is energized, heater 79 is energized to artifically heat bimetal 64 to cause the temperature of the bimetal to increase faster than normal to shut off the heat supply to the space to prevent abnormal overshooting of the space temperature. As the bimetal temperature increases, shaft 65 would rotate in the opposite direction to tip switch 3 to open the circuit and de-energize the valve.

Figure 4:
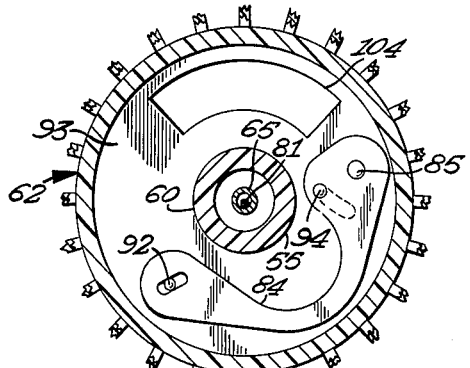
FIGURE 4 is a sectional view of the mechanism for adjusting the control point of the sensing element in the thermostat of FIGURE 1.

For a given control point setting, the position of member 62 would indicate the control point on the index 78 of scale 82. To change the control point, member 62 can be rotated. Upon turning member 62 in a clockwise direction, the lower end of lever 84 as shown in FIGURE 6 and FIGURE 4 moves clockwise about pin 85 and pin 94 moves enclosure 63 counterclockwise to adjust the outer extremity of bimetal 64 to change the control point. By the lever ratios involved, a reduction in the angular movement of enclosure 63 is provided for a given angular movement of member 62. To adjust the initial position of member 63 with respect to a given position of member 62, screw 103 can be loosened to readjust the position of hole 100 with respect to enclosure 63 so that for a given control point setting of member 62 as indicated on the index 78 of scale plate 82, bimetal 64 will cause switch 23 to close at that particular bimetal temperature.

The present invention has been described in one particular manner; however, the intent is to limit the scope of the invention only by the scope of the appended claims in which I claim:

1. In a thermostat, a case adapted to be mounted in a wall of a space, said case being insulated to reduce its heat loss to said wall, a separating member having a hole therethrough and a concave front surface, means mounting said separating member in said case to provide a chamber in the rear portion of said case to which access is provided through said hole, a supporting member having a first portion connected to said separating member and a second enclosure portion held in space relationship in said concave opening of said separating member, a set point adjusting member being pivotally supported on said first portion and surrounding said supporting member, a switch mounted in said chamber, an adjustable member mounted in said enclosure member, a temperature responsive element, means connecting said temperature responsive element between said adjustable member and said switch, said last mentioned means extending through an opening of said supporting member, a first member having a first and second ends, means connecting one end of said first member to said enclosure member, means connecting a second end of said first member to said set point adjustment member so that upon a rotation of set point adjusting member said first member is pivoted with respect to said base, means connecting said first member to said adjustable member, said last mentioned means having a pin protruding from said first member near said first end so that upon the angular movement of said set point adjusting member said adjusting member is moved only a portion of the angle of movement of said set point adjusting member, and indicating scale associated with said set point adjusting member whereby said indicating scale has a greater angular spread for a given temperature range than the angular movement required for said adjusting member to change the control point of said temperature responsive means through said range.

2. In a control point adjusting means for a thermostat, a first member having a hollow shaft and an enclosure portion, means connecting said shaft portion to said base, a cup shaped outer cover pivotally supported on said shaft and covering said enclosure portion whereby said outer cover can be moved through a predetermined angle, a lever having one end pivotally connected to said enclosure portion, means connecting another end of said lever to said cup member, a spiral bimetal element, a shaft, means connecting one end of said element to said shaft, an enclosure member, said shaft being mounted in said hollow shaft with said element enclosed by and connected to said enclosure member, switch means, means connecting said switch means to said shaft, said switch means being operated at a predetermined angle when said shaft turns as said element changes in temperature depending upon the position of said enclosure member, means connecting said lever to said enclosure member whereby the position of said enclosure member with respect to said base can be changed to change the temperature for said predetermined angle of said switch, a scale, and means associated with said cup cover to cooperate with said scale to determine a control temperature whereby said scale is magnified greatly over the angle said enclosure member must be rotated to obtain a given change in control temperature.

3. In a thermostat, a base being adapted to be mounted to a wall in a space in which the temperature is to be controlled, a temperature responsive means, connection means connecting said responsive means to said base, switch means, means connecting said switch means to said responsive means, said switch means being adapted to control the supply of conditioned medium to the space for changing the temperature of the air in the space, a control point adjustment means, and means connecting said adjustment means to said responsive means and said switch, said adjustment means comprising: a first member having a hollow shaft and a cage portion, means connecting said shaft portion to said base, a cup shaped outer cover pivotally supported on said shaft and covering said cage whereby said outer cover can be moved through a predetermined angle, a lever having one end pivotally connected to said cage, means connecting another end of said lever to said cup member, a spiral bimetal element, a shaft, means connecting one end of said element to said shaft, a support member enclosed in said cage, said shaft being mounted in said hollow shaft with said element enclosed by and connected to said support member, switch means, means connecting said switch means to said shaft, said switch means being operated at a predetermined angle when said shaft turns as said element changes in temperature depending upon the position of said support member, a pin fastened to said lever between its ends, means connecting said pin to said support member whereby the position of said support member with respect to said base can be changed to change the temperature for said predetermined angle of said switch, a scale, and means associated with said cover member to cooperate with said scale to determine a control temperature whereby said scale is magnified greatly over the angle said support member must be rotated to obtain a given change in control temperature.

4. In a thermostat, a base adapted to be recessed in a wall, said base having a cup shaped front opening, temperature sensing means, and means mounting said temperature sensing means on to said base in front of said cup shaped opening whereby air flowing along a surface of the wall flows behind said sensing means so said sensing means only responds to the temperature of air in said space, said sensing means comprising a first enclosing member connected to said base, a cover pivotally mounted on said first member, a second enclosing member mounted inside said first member, a temperature responsive element having one end connected to said second enclosure member, a switch, means connecting another end of said element to control a position of said switch, and connecting means connecting said cover and said second member to change a control point of said element.

5. In a thermostat comprising, a base member, said base member being adapted to be mounted in a recessed manner in a wall, said base having a front chamber and a rear chamber, said chambers are connected by a passageway, said front chamber having a front opening with an edge thereof being common with a surface of the wall, temperature responsive element, means mounting said element with said element supported in said opening, switch means, said switch means being contained in said second chamber to said element, and connection means connecting said element to said switch means, said element responding to the temperature of air in a space beyond said wall and as air flows along the wall the air is pulled inward behind said element along the surface of said front chamber to not contact said element, said air being pulled inward can flow in and out said passageway to maintain the temperature of air in said second chamber closer to the temperature of said space.

6. In a space temperature responsive device adapted to be mounted on a wall of a space to sense the temperature of air in the space and be affected a minimum amount by air flowing along the surface of the wall, a base having a surface defining a recessed opening, said surface being contoured with a gradual change in slope, said base being adapted to be mounted in the wall with a front portion of the surface forming said recessed opening being adjacent the surface of the wall whereby a layer of air flowing along said wall flows along the recessed gradually contoured surface thereof before continuing to flow along the wall surface, a temperature sensing element, and connecting means connecting said sensing element to said base to be supported centrally in front of said recessed surface to not be affected by said air layer.

7. A thermostat comprising, a base member, said base member being adapted to be mounted in a recessed manner in a wall, said base having a front chamber and a rear chamber, said front chamber having a front opening with an edge thereof being common with a surface of the wall and an inner surface of said front chamber, temperature responsive element having an output member, means connecting said element with said member extending from said front chamber to said second chamber with said element supported in said opening, switch means, means connecting said switch means to said member in said second chamber, said element responding to the temperature of air in a space beyond said wall and air flowing along the wall, said air is pulled inward behind said element along the surface of said front chamber to be affected by said element.

8. A thermostat to be on a cold wall in a space being heated wherein a layer of cold air flows downward along the surface of the wall and air having a representative temperature of the space is adjacent the layer of cold air comprising, a base having a front opening, said base being adapted to be mounted in the wall with said front opening forming a recessed surface mating with the wall surface, said recessed surface being gradually contoured, temperature responsive means, and means mounting said temperature responsive means on said base so said responsive means is centrally supported in front of said opening with a uniform annular space between said base and said responsive means, said responsive means being adapted to control the temperature of air in the space, said responsive means being unaffected by the cold air as the cold air flows downward along said gradually contoured recessed surface behind said responsive means and being affected by space air to maintain the space air temperature at a selected value.

9. In a space temperature responsive device for avoiding the effect of the downward flow of a stream of cold air adjacent a cold wall of a space on which the thermostat is to be mounted and for responding to the temperature of the air beyond the layer of cold air which is indicative of the space air temperature, a base mounted in the wall, said base having a front surface which is recessed to be behind the wall surface, said front surface gradually curving inward from an axis of the stream of cold air along the wall, temperature responsive means, and connecting means mounting said responsive means to said base in front of said surface to provide a uniform annular air flow space between said responsive means and said surface, said stream flowing along said surface to deviate from said axis along the wall to follow said gradually curving front surface by the "Coanda Effect" passing behind said responsive means, said responsive means responding to said air beyond said cold air stream.

References Cited by the Examiner

UNITED STATES PATENTS 1,919,330   7/1933   Hornung.
2,273,375   2/1942   Ray.

BERNARD A. GILHEANY, Primary Examiner.

L. A. WRIGHT, Assistant Examiner.